(12) United States Patent
Shinohara

(10) Patent No.: US 9,939,040 B2
(45) Date of Patent: Apr. 10, 2018

(54) LIQUID-SEALED VIBRATION PREVENTION DEVICE

(71) Applicant: YAMASHITA RUBBER CO., LTD., Saitama (JP)

(72) Inventor: Yutaka Shinohara, Saitama (JP)

(73) Assignee: YAMASHITA RUBBER CO., LTD., Fujimino, Saitama (JP)

( * ) Notice: Subject to any disclaimer, the term of this patent is extended or adjusted under 35 U.S.C. 154(b) by 125 days.

(21) Appl. No.: 14/778,136

(22) PCT Filed: Mar. 5, 2014

(86) PCT No.: PCT/JP2014/055551
§ 371 (c)(1),
(2) Date: Sep. 18, 2015

(87) PCT Pub. No.: WO2014/156515
PCT Pub. Date: Oct. 2, 2014

(65) Prior Publication Data
US 2017/0074347 A1  Mar. 16, 2017

(30) Foreign Application Priority Data

Mar. 29, 2013  (JP) .................................. 2013-073241

(51) Int. Cl.
| | | |
|---|---|---|
| *F16F 13/04* | (2006.01) | |
| *F16F 13/16* | (2006.01) | |
| *B60G 15/06* | (2006.01) | |

(52) U.S. Cl.
CPC .............. *F16F 13/16* (2013.01); *B60G 15/06* (2013.01)

(58) Field of Classification Search
CPC .......... F16F 1/387; F16F 1/3821; F16F 13/14; F16F 13/1409; B60G 2204/41062
(Continued)

(56) References Cited

U.S. PATENT DOCUMENTS

| | | | |
|---|---|---|---|
| 7,198,258 B2 | 4/2007 | Sato et al. | |
| 7,722,018 B2 * | 5/2010 | Meyerboeck | F16F 1/3842 248/635 |

(Continued)

FOREIGN PATENT DOCUMENTS

| | | |
|---|---|---|
| CN | 101253347 A | 8/2008 |
| CN | 102996701 A | 3/2013 |

(Continued)

OTHER PUBLICATIONS

International Search Report and Written Opinion dated Apr. 8, 2014 corresponding to International Patent Application No. PCT/JP2014/055551 and English translation thereof.

(Continued)

*Primary Examiner* — Bradley T King
*Assistant Examiner* — Stephen M Bowes
(74) *Attorney, Agent, or Firm* — Squire Patton Boggs (US) LLP

(57) ABSTRACT

A liquid-sealed vibration prevention device is provided with a main rubber-elastic body for elastically connecting an inner cylinder with an intermediate sleeve, an outer cylinder for sheathing the intermediate sleeve, and a seal rubber layer positioned on the inner-circumferential surface of the outer cylinder. The intermediate sleeve has an upper ring part, and the upper end face of the upper ring part is provided with an inclined projection part which extends diagonally upward toward the inner cylinder. Moreover, a pair of rotation-stop rubbers that holds the inclined projection part in the circumferential direction of the intermediate sleeve is provided on the inner side of an annular recess of the outer cylinder and on the upper part side of the seal rubber layer.

5 Claims, 11 Drawing Sheets

(58) Field of Classification Search
USPC .................................................. 267/140.12
See application file for complete search history.

(56) References Cited

U.S. PATENT DOCUMENTS

| | | | |
|---|---|---|---|
| 2002/0038927 A1* | 4/2002 | Mayerbock .............. | B60G 7/02 |
| | | | 267/140.12 |
| 2005/0035506 A1* | 2/2005 | de Fontenay .......... | B60G 7/006 |
| | | | 267/140.12 |
| 2007/0045918 A1 | 3/2007 | Thornhill et al. | |
| 2013/0062822 A1 | 3/2013 | Matsushita | |

FOREIGN PATENT DOCUMENTS

| | | | |
|---|---|---|---|
| GB | 2442926 A | | 4/2008 |
| JP | 06129481 A | * | 5/1994 |
| JP | 06-054941 U | | 7/1994 |
| JP | 2008249052 A | | 10/2008 |
| JP | 4367324 B2 | | 11/2009 |

OTHER PUBLICATIONS

Chinese Office Action application No. 201480018393 dated Aug. 24, 2016.
Chinese Office Action application No. 201480018393ated dated Aug. 24, 2016.

* cited by examiner

LIQUID-SEALED VIBRATION PREVENTION DEVICE

TECHNICAL FIELD

The present invention relates to a liquid-sealed vibration prevention device having an inner cylinder and an intermediate sleeve which are elastically connected by a main rubber elastic body.

BACKGROUND ART

As this kind of liquid-sealed vibration prevention device, there is known a suspension member mount of an automobile. This suspension member mount is constituted by an inner cylinder, an intermediate sleeve disposed at a distance on the outer side of the inner cylinder, a main rubber elastic body elastically connecting the inner cylinder and the intermediate sleeve to each other, and an outer cylinder sheathing the intermediate sleeve (for example, see Patent Literature 1). Provided between the inner cylinder and the outer cylinder is a fluid chamber filled with incompressible fluid.

The inner cylinder and the intermediate sleeve are constituted as a unified vulcanized and molded article in which the main rubber elastic body is bonded with vulcanization to the outer periphery of the inner cylinder and the inner periphery of the intermediate sleeve. The vulcanized and molded article is equipped with a set of orifice-forming members. The outer cylinder provided with a seal rubber layer on an inner wall thereof is allowed to sheathe the vulcanized and molded article equipped with the orifice-forming members from the lower part side of the vulcanized and molded article, thereby completing a suspension member mount in which the inner cylinder, the intermediate sleeve and the outer cylinder are fitted into each other in a unified manner.

CITATION LIST

Patent Literature

Patent Literature 1: Japanese Patent Publication No. 4367324

SUMMARY OF THE INVENTION

Technical Problem

Incidentally, the suspension member mount disclosed in Patent Literature 1 includes an inner flange which is formed by bending a lower part of the outer cylinder by a predetermined length on the inside. The intermediate sleeve allows a lower end face thereof to come into abutment with the inner flange provided on the lower part of the outer cylinder to restrict a displacement in the axial direction thereof, thereby achieving retaining in the axial direction of the inner cylinder, the main rubber elastic body and the intermediate sleeve.

For this purpose, the suspension member mount disclosed in Patent Literature 1 requires, before assembly process, bending work for previously bending the lower part of the outer cylinder on the inside. This results in an increase in manufacturing process for the bending work and a rise in manufacturing cost.

A general object of the present invention is to provide a liquid-sealed vibration prevention device capable of achieving retaining in an axial direction, positioning, and rotation-stop, of an intermediate sleeve and the like relative to an outer cylinder, with a simple structure.

Solution to Problem

In order to attain the above object, the present invention provides a liquid-sealed vibration prevention device including: an inner cylinder; an intermediate sleeve disposed outside the inner cylinder; a main rubber elastic body which is interposed between the inner cylinder and the intermediate sleeve to elastically connect the inner cylinder with the intermediate sleeve; an outer cylinder which sheathes the intermediate sleeve; and a seal rubber layer disposed on an inner circumferential surface of the outer cylinder, wherein the intermediate sleeve is provided with a projection part which extends upward.

According to the present invention, for example, due to vibration (load) given from tires (wheels), even where the inner cylinder side assembly (the inner cylinder, the intermediate sleeve and the main rubber elastic body) is about to be displaced along an axial direction of the outer cylinder side assembly (the outer cylinder and the seal rubber layer), the projection part slidingly contacts with (abuts on) the seal rubber layer to restrict the displacement. As a result, the present invention makes it possible to achieve retaining in the axial direction of the intermediate sleeve and the like, with a simple structure in which the projection part is provided on the upper end face of the intermediate sleeve (upper ring part).

Also, a set of rotation-stop parts may be provided on the upper part side of the seal rubber layer to hold therebetween the projection part in a circumferential direction. This allows the set of rotation-stop parts, which hold therebetween the projection part in the circumferential direction, to achieve rotation-stop in the circumferential direction of the intermediate sleeve and the like, together with a retaining action by the projection part in the axial direction of the intermediate sleeve and the like.

Moreover, at the time of assembly of the outer cylinder side assembly and the inner cylinder side assembly, for example, when the outer cylinder side assembly is allowed to sheathe the inner cylinder side assembly, the rotation-stop parts provided on the outer cylinder side assembly abut on an upper end face of the intermediate sleeve in the inner cylinder side assembly to achieve positioning in the axial direction of the intermediate sleeve, and the projection part abuts on (slidingly contacts with) an inner periphery of the seal rubber layer to achieve positioning in the circumferential direction of the intermediate sleeve. As a result, the present invention makes it possible to easily perform the positioning in the axial direction and the circumferential direction of the outer cylinder side assembly and the inner cylinder side assembly.

The projection part may be provided at at least one or more locations. This makes it possible to achieve the retaining function in the axial direction of the intermediate sleeve and the like, even by a single projection part.

Moreover, an upper end portion of the intermediate sleeve on which no projection part is provided may abut on a lower surface of the rotation-stop part. This allows the upper end portion of the intermediate sleeve on which no projection part is provided, to abut on the lower surface of the rotation-stop part, thereby making it possible to reliably achieve retaining in the axial direction.

Furthermore, the projection part may be an inclined projection part which extends diagonally upward toward the inner cylinder. This makes it possible to easily produce the inclined projection part which extends diagonally upward toward the inner cylinder.

Advantageous Effects of the Invention

According to the present invention, a liquid-sealed vibration prevention device can be obtained that is allowed to achieve retaining in the axial direction, positioning, and rotation-stop, of the intermediate sleeve and the like relative to the outer cylinder, with a simple structure.

DESCRIPTION OF EMBODIMENTS

Embodiments of the present invention will be hereinafter described in detail with reference to the drawings as appropriate.

Figure 1:
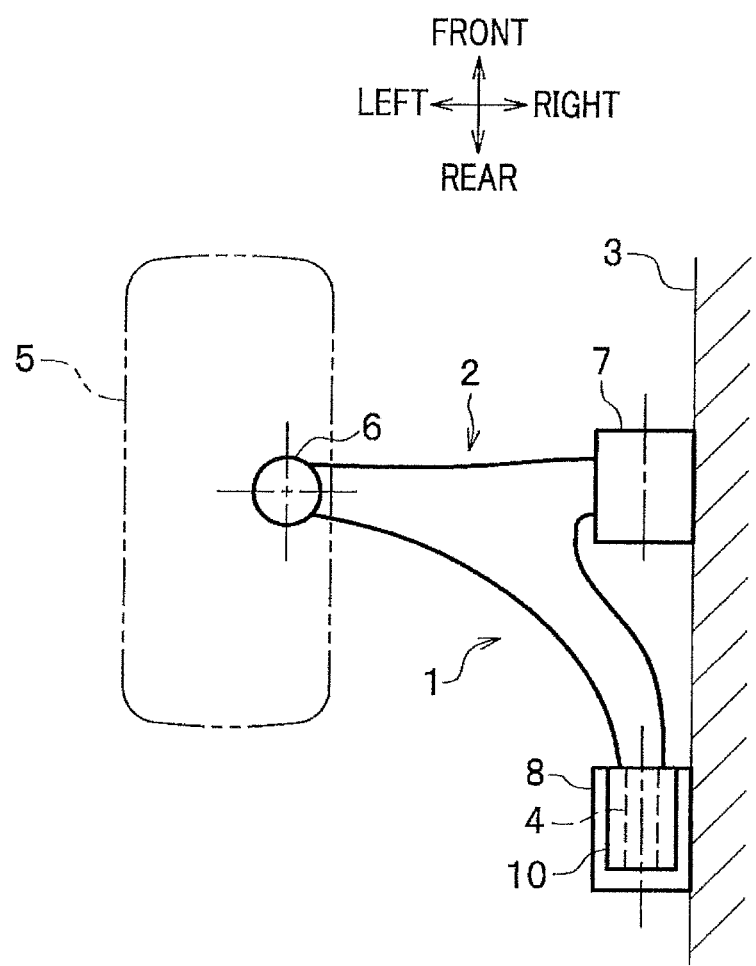
FIG. 1 is a schematic plan view showing a state in which a liquid-sealed vibration prevention device according to an embodiment of the present invention is applied to a suspension of a vehicle.

As shown in FIG. 1, a liquid-sealed vibration prevention device 10 according to an embodiment of the present invention is composed of a bushing which couples a lower arm 2 constituting a suspension 1 of a left rear wheel of an automobile with a body frame 3 and pivotally supports a shaft portion 4 of the lower arm 2. Note that in FIG. 1, reference sign 5 denotes a tire, reference sign 6 denotes a ball joint, and reference signs 7, 8 denote a support member on the vehicle body, respectively. Moreover, an up-down direction in the present embodiment does not conform to a state in which the liquid-sealed vibration prevention device 10 shown in FIG. 1 is attached to the suspension 1, but means the up-down direction in the drawings.

Figure 3:
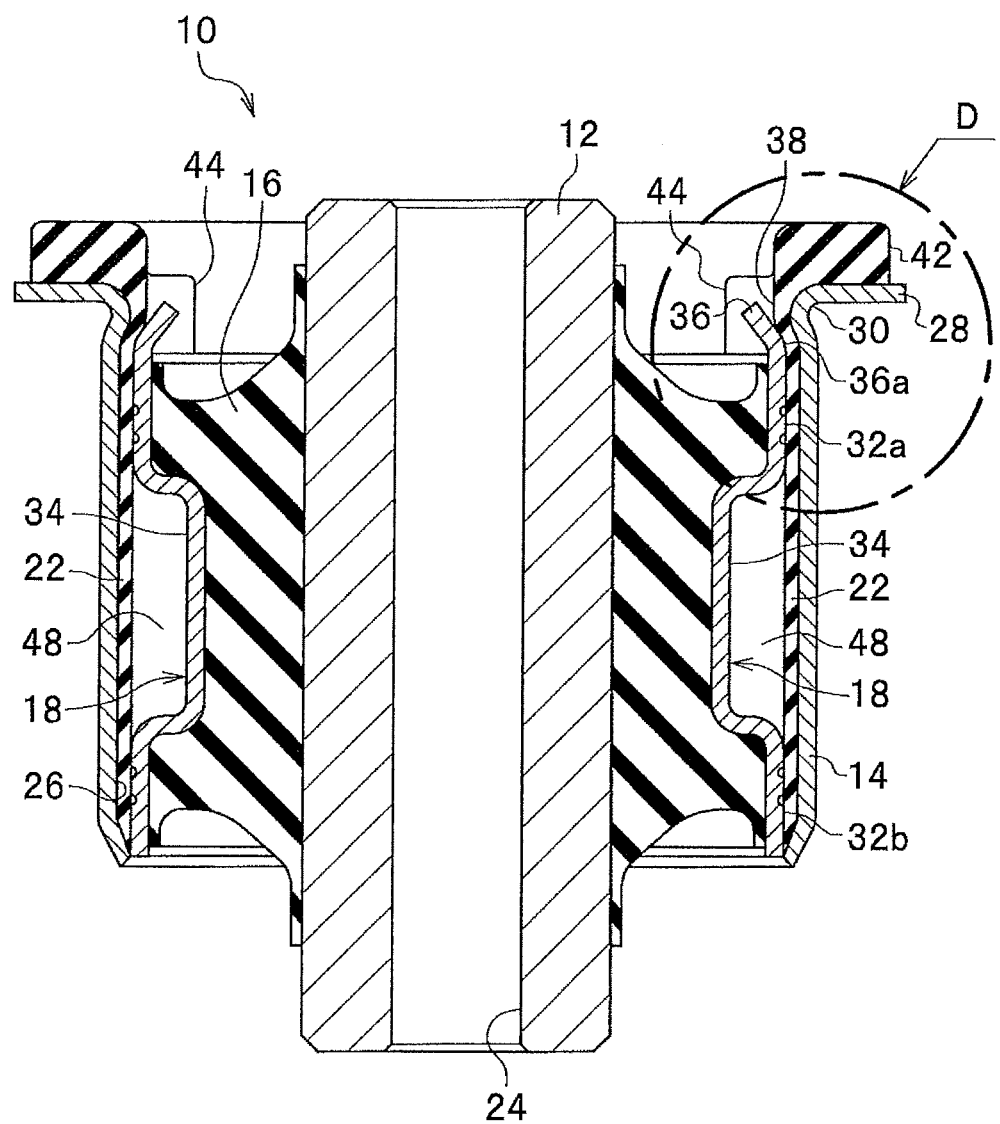
FIG. 3 is a sectional view in the axial direction, taken along the A-A line in FIG. 2.
Figure 4:
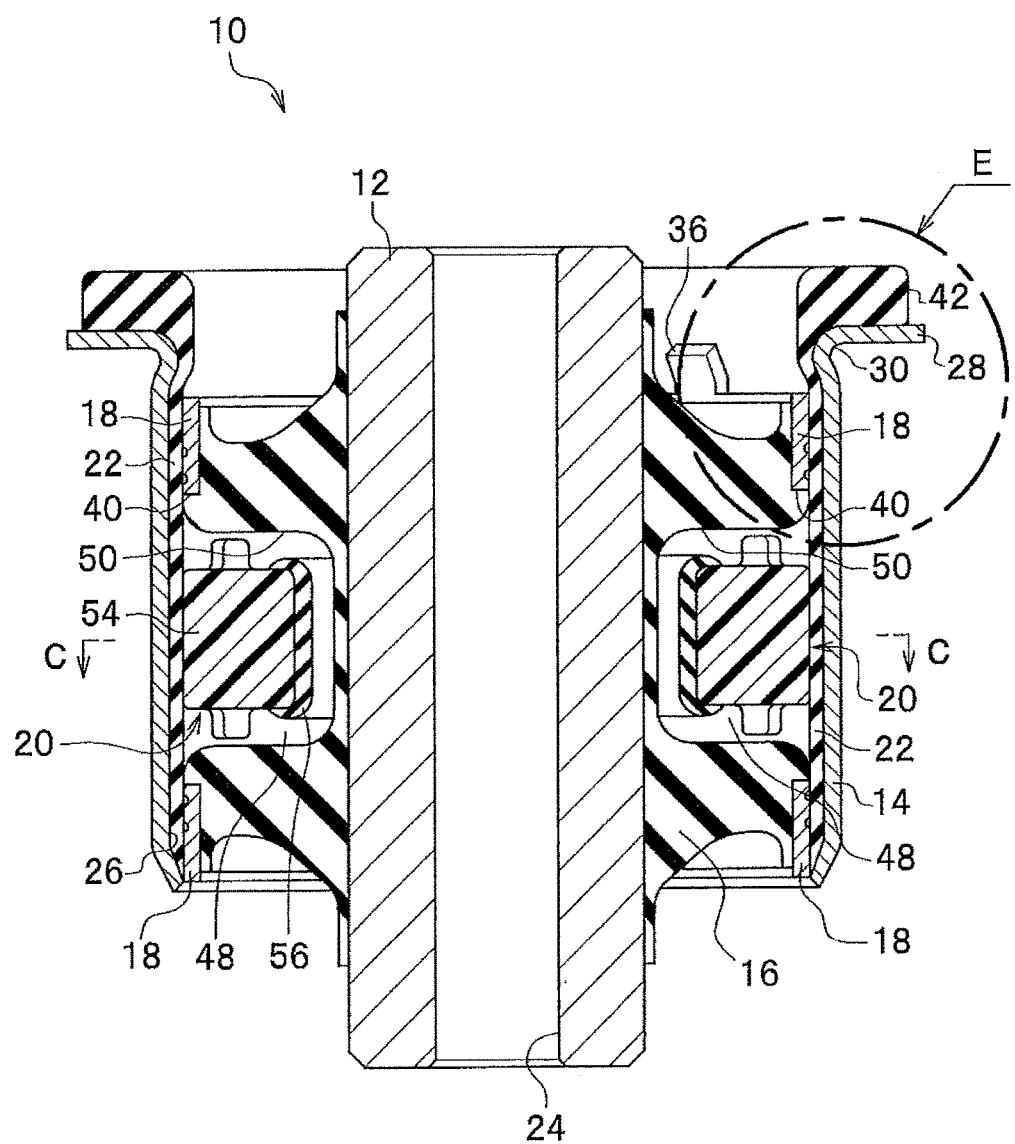
FIG. 4 is a sectional view in the axial direction, taken along the B-B Line in FIG. 2.

As shown in FIG. 3 and FIG. 4, the liquid-sealed vibration prevention device 10 is constituted by an inner cylinder 12, an outer cylinder 14, a main rubber elastic body 16, an intermediate sleeve 18, a pair of orifice-forming members 20, 20 (see FIG. 4), and a seal rubber layer 22. Note that a unit configured by assembling the inner cylinder 12, the main rubber elastic body 16, the intermediate sleeve 18 and the pair of orifice-forming members 20, 20 in a unified manner constitutes an inner cylinder side assembly. Also, a unit composed of the outer cylinder 14 and the seal rubber layer 22 constitutes an outer cylinder side assembly.

The inner cylinder 12 is composed of a cylindrical body in which a through-hole 24 is formed in an axial direction. Dimensions of an outside diameter and an inside diameter of the inner cylinder 12 are set to be constant from one end to another end along the axial direction.

The outer cylinder 14 is disposed outside the inner cylinder 12. The outer cylinder 14 is composed of a cylindrical body which is formed thinner than that of the inner cylinder 12 and in which a through-hole 26 is formed in an axial direction. An upper end portion (end portion on one side in the axial direction) of the outer cylinder 14 is provided with an outer flange 28. The outer flange 28 is provided to bend outwardly in a direction nearly perpendicular to the central axis of the inner cylinder 12 and to extend by a predetermined length outwardly in the radial direction. The outer flange 28 is formed on an opening periphery on the upper side (on the one side in the axial direction) of the outer cylinder 14.

On a bent portion (base portion) on the outer surface side of the outer flange 28, an annular recess 30 having an arc-like cross-section is formed over the entire circumference of the outer cylinder 14. The annular recess 30 has a decreasing diameter toward the side of the inner cylinder 12, compared to the other cylindrical portion of the outer cylinder 14. Note that the dimension (axial length) along the axial direction of the outer cylinder 14 is set to be shorter by a predetermined length than the dimension (axial length) along the axial direction of the inner cylinder 12.

As shown in FIG. 3, the main rubber elastic body 16 is interposed between the inner cylinder 12 and the intermediate sleeve 18 to elastically connect the inner cylinder 12 with the intermediate sleeve 18. An inner periphery of the main rubber elastic body 16 is bonded with vulcanization to an outer periphery of the inner cylinder 12, and an outer periphery of the main rubber elastic body 16 is bonded with vulcanization to an inner periphery of the intermediate sleeve 18. The main rubber elastic body 16 is formed, for example, by injecting molten rubber into space between the inner cylinder 12 and the intermediate sleeve 18 which are set in a mold (not shown).

The intermediate sleeve 18 is disposed at a position away from the inner cylinder 12 by a predetermined distance outwardly in the radial direction and is connected via the main rubber elastic body 16 to the inner cylinder 12. As shown in FIG. 3, the intermediate sleeve 18 includes an upper ring part 32a, a lower ring part 32b, a set of connection parts 34, 34 which connect the upper ring part 32a with the lower ring part 32b, and a pair of inclined projection parts (projection parts) 36, 36 which extends diagonally upward toward an upper end of the inner cylinder 12 from an upper end face of the upper ring part 32a.

The upper ring part 32a and the lower ring part 32b are formed in a continuous cylindrical shape without discontinuity over the entire inner periphery of the seal rubber layer 22 and are not provided with any portion concaved or projecting in a direction perpendicular to the axial direction, respectively. Moreover, the upper end face of the upper ring part 32a is located on the lower side than the minimum inside diameter portion in the annular recess 30 of the outer cylinder 14.

The upper ring part 32a and the lower ring part 32b are connected with each other by the set of connection parts 34, 34. The set of connection parts 34, 34 are disposed opposite to each other and extend along the axial direction of the inner cylinder 12. A lower end face of the upper ring part 32a, an upper end face of the lower ring part 32b, and lateral faces of the set of connection parts 34, 34 form a set of rectangular window parts 40, 40 (see FIG. 4) which are disposed opposite to each other.

Figure 6:
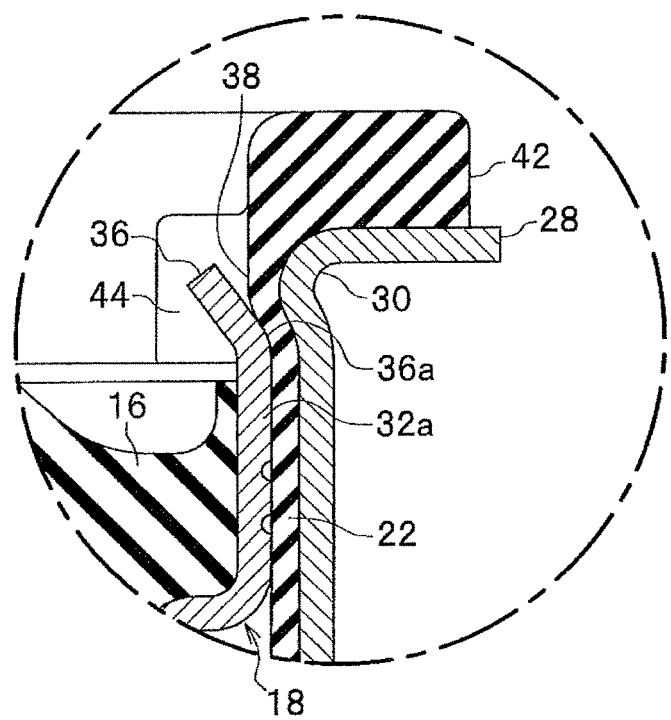
FIG. 6 is a partially enlarged sectional view of the portion D shown in FIG. 3.
Figure 7:
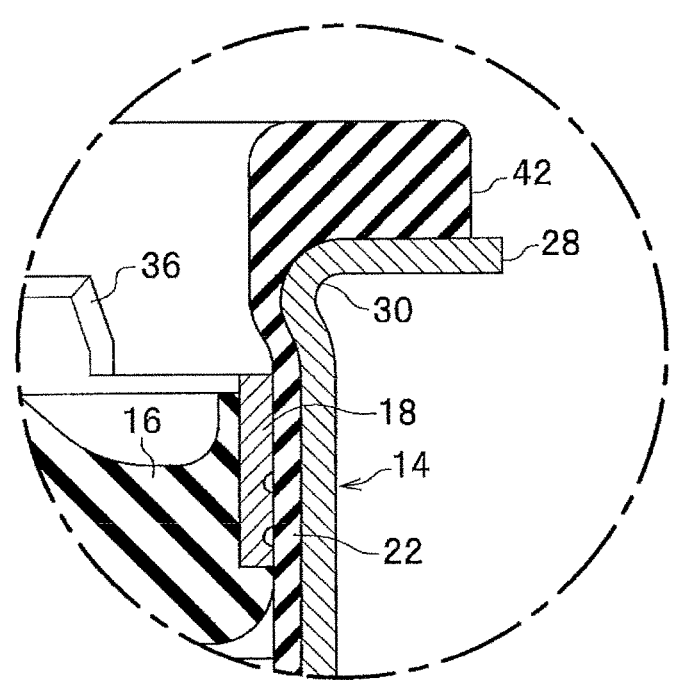
FIG. 7 is a partially enlarged sectional view of the portion E shown in FIG. 4.

The pair of inclined projection parts 36, 36 is disposed opposite to each other. More specifically, the pair of inclined projection parts 36, 36 is spaced at an angle of about 180 degrees along the circumferential direction (see FIG. 2). As shown in FIG. 6, a tip face of the inclined projection part 36 is located on the upper side than the minimum inside diameter portion in the annular recess 30 of the outer cylinder 14 and is provided to be distanced from the inner periphery of the seal rubber layer 22. Moreover, a base end outer face 36a of the inclined projection part 36 abuts on a retaining rubber 38 located on the upper side of the seal rubber layer 22, on the lower side than the minimum inside diameter portion in the annular recess 30 of the outer cylinder 14.

Note that, although the present embodiment exemplifies the case where the pair of inclined projection parts 36, 36 is provided, but not limited to this case, one or more inclined projection parts may be provided. Even in a case where a single inclined projection part 36 is provided, retaining in the axial direction of the intermediate sleeve 18 and the like can be reliably achieved. The "one or more" also means, for example, a case where the inclined projection part 36 is formed over the entire periphery of the upper ring part 32a.

The seal rubber layer 22 is formed continuously with a thin thickness along the inner periphery of the outer cylinder 14 and bonded with vulcanization to the inner periphery of the outer cylinder 14. Note that in the present embodiment, "the seal rubber layer" means a thinly-formed rubber portion which is interposed between the outer periphery of the intermediate sleeve 18 and the inner periphery of the outer cylinder 14 to seal the gap between them.

Provided on the upper side of the seal rubber layer 22 is the retaining rubber 38 which is located on the inner side of the annular recess 30 of the outer cylinder 14. The retaining rubber 38 is provided to project more inwardly than the seal rubber layer 22 in the direction perpendicular to the axial direction. Moreover, provided on the upper side of the retaining rubber 38 is a stopper 42 which is thickly formed. The stopper 42 is provided on the upper surface of the outer flange 28 over the entire periphery.

Figure 2:
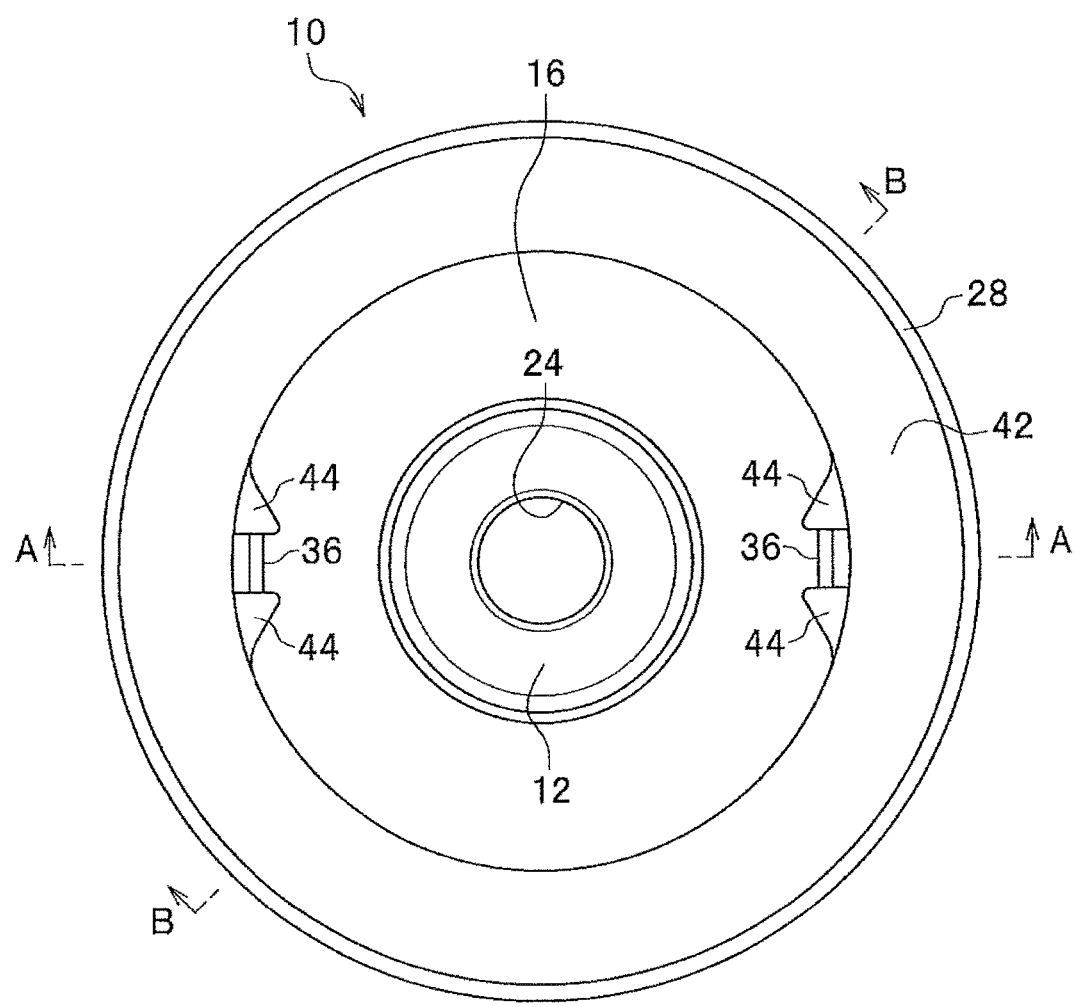
FIG. 2 is a plan view of the liquid-sealed vibration prevention device shown in FIG. 1.

A pair of rotation-stop rubbers (rotation-stop parts) 44 is provided on the inner side of the annular recess 30 of the outer cylinder 14 and on the upper part side of the seal rubber layer 22. The pair of rotation-stop rubbers 44 is provided to hold the inclined projection part 36 in the circumferential direction of the intermediate sleeve 18 (see FIG. 2). The pair of rotation-stop rubbers 44 according to the present embodiment projects more inwardly (toward the side of the inner cylinder 12) than the retaining rubbers 38 in the direction perpendicular to the axial direction (see FIG. 3), and has the form of nearly a triangle in planar view. Each rotation-stop rubber 44 is formed continuously with a stepped portion on the inside in the radial direction of the stopper 42. As shown in FIG. 2, the pair of rotation-stop rubbers 44 is provided at two locations at an angle of about 180 degrees along the circumferential direction.

Each rotation-stop rubber 44 has the form of nearly a triangle having its vertex on the inner side of the intermediate sleeve 18 in planar view (see FIG. 2), and is formed in a nearly rectangular shape in side view (see FIG. 3). Namely, each rotation-stop rubber 44 has the form of a triangle pole. As shown in FIG. 6, an upper surface of each rotation-stop rubber 44 is set to be higher than the upper surface of the outer flange 28, and a lower surface thereof abuts on the upper end face of the intermediate sleeve 18 (the upper end face of the upper ring part 32a) on which the inclined projection part 36 is not provided.

Figure 5:
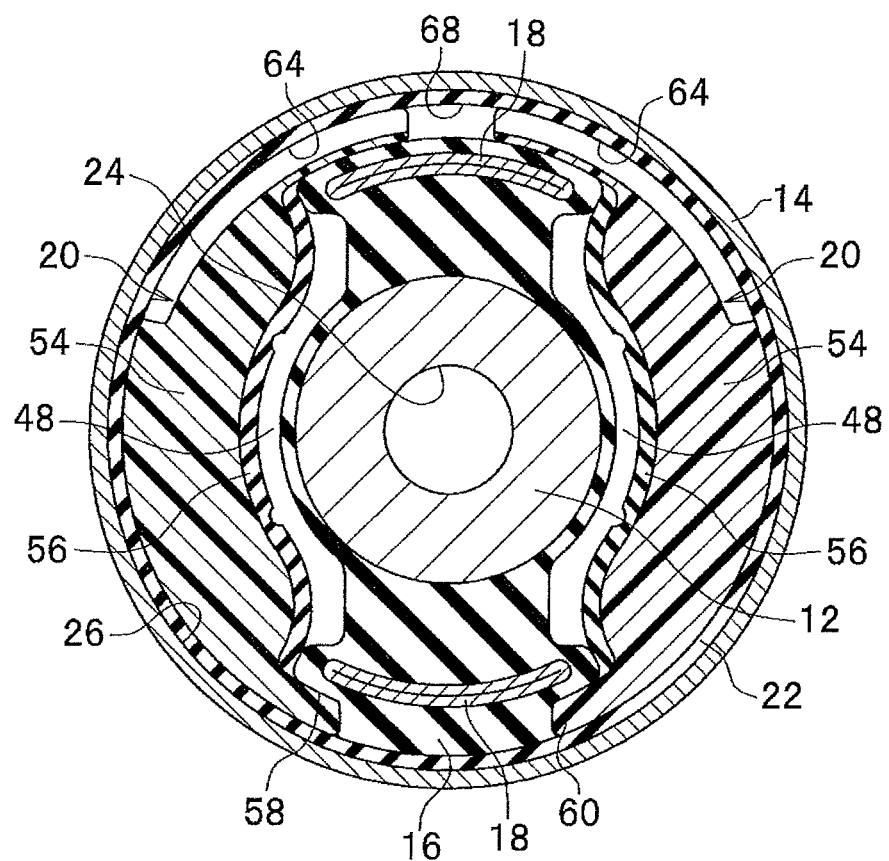
FIG. 5 is a sectional view in a direction perpendicular to the axial direction, taken along the C-C line in FIG. 4.

As shown in FIG. 4 and FIG. 5, provided between the inner cylinder 12 and the outer cylinder 14 is a pair of fluid chambers 48, 48 which are opposite to each other and sealed by the main rubber elastic body 16 and the seal rubber layer 22. The pair of fluid chambers 48, 48 is filled with incompressible fluid.

Formed in an intermediate part in the axial direction of the main rubber elastic body 16 is a pair of fitting recesses 50, 50 which extend along the axial direction and constitute a portion of the fluid chamber 48. The pair of fitting recesses 50, 50 is equipped with the pair of orifice-forming members 20, 20.

Figure 8A:
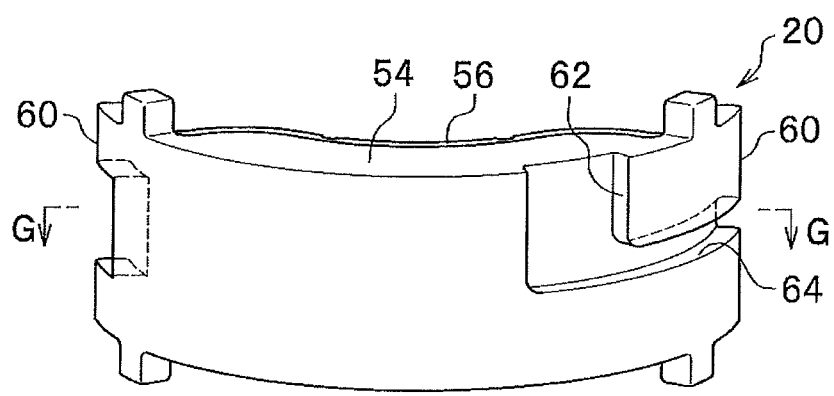
FIG. 8A is a perspective view of an orifice-forming member constituting the liquid-sealed vibration prevention device shown in FIG. 1.
Figure 8B:
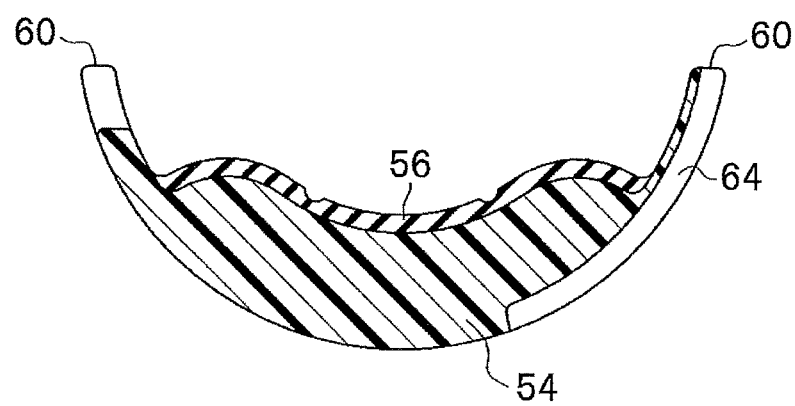
FIG. 8B is a transverse sectional view taken along the G-G line in FIG. 8A.

The pair of orifice-forming members 20, 20 is formed of resin material in the same shape, respectively. As shown in FIG. 8A and FIG. 8B, each orifice-forming member 20 is constituted by a main body 54 having a nearly semicircular shape in planar view, and a stopper rubber 56 fixed to an inner wall of the main body 54. Provided on both ends of the main body 54 is an engaging projection 60 which is engaged with an engaging recess 58 (see FIG. 5) formed on the main rubber elastic body 16. Formed on an outer periphery of the main body 54 are a longitudinal groove 62 which extends parallel to the axial direction of the inner cylinder 12, and an orifice channel 64 which is connected to a lower end portion of the longitudinal groove 62 to extend along the circumferential direction.

One fluid chamber 48 and the other fluid chamber 48 are communicated with each other via the pair of orifice-forming members 20, 20 and a communication channel 68 formed in the main rubber elastic body 16 (see FIG. 5). Namely, one orifice-forming member 20 and the other orifice-forming member 20 are attached so that the respective orifice channels 64, 64 are communicated with each other via the communication channel 68. This allows incompressible fluid filled in the pair of fluid chambers 48, 48 to be capable of mutually flowing between the pair of fluid chambers 48, 48 via the pair of orifice-forming members 20, 20.

The liquid-sealed vibration prevention device 10 according to the present embodiment is basically configured as described above, and operations, actions and effects thereof will be described below.

When vibration (load) is given from the tire 5 via the lower arm 2 to the liquid-sealed vibration prevention device 10 in the direction perpendicular to the axial direction, the main rubber elastic body 16 is elastically deformed. This elastic deformation causes a differential pressure (fluid pressure difference) to be generated between one fluid chamber 48 and the other fluid chamber 48 to allow the incompressible fluid to flow through the orifice channels 64 between one fluid chamber 48 and the other fluid chamber 48. Flow of the incompressible fluid through the orifice channels 64 causes a resonance action, and based on the resonance action, a vibration prevention effect is produced. More specifically, the incompressible fluid flows through the orifice channels 64 to cause an attenuation action, thereby absorbing the vibration. At the same time, based on a spring action by the main rubber elastic body 16, a vibration prevention effect is produced. Thus, obtained is a vibration prevention effect synergized by the vibration prevention effect by the spring action and the vibration prevention effect by the resonance action.

In the liquid-sealed vibration prevention device 10 according to the present embodiment, the inclined projection part 36 is provided on the upper end face of the upper ring part 32a of the intermediate sleeve 18 to extend diagonally upward toward the inner cylinder 12. The inclined projection part 36 abuts on the retaining rubber 38 provided on the upper side of the seal rubber layer 22, thereby making it possible to ensure retaining of the intermediate sleeve 18 relative to the outer cylinder 14.

More specifically, according to the present embodiment, for example, due to vibration (load) given from the tire 5 (wheel), even where the inner cylinder side assembly (the inner cylinder 12, the intermediate sleeve 18 and the main rubber elastic body 16) is about to be displaced along the axial direction of the outer cylinder side assembly (the outer cylinder 14 and the seal rubber layer 22), the inclined projection part 36 abuts on (slidingly contacts with) the seal rubber layer 22 (retaining rubber 38) to restrict the displacement. As a result, the present embodiment makes it possible to achieve retaining in the axial direction of the intermediate sleeve 18 and the like, with a simple structure in which the inclined projection part 36 is provided on the upper end face of the upper ring part 32a.

Also, according to the present embodiment, rotation-stop in the circumferential direction of the intermediate sleeve 18 and the like is achieved by the pair of rotation-stop rubbers 44 which hold therebetween the inclined projection part 36 in the circumferential direction, together with the retaining action by the inclined projection part 36 in the axial direction of the intermediate sleeve 18 and the like.

Moreover, according to the present embodiment, at the time of assembly of the outer cylinder side assembly (the outer cylinder 14 and the seal rubber layer 22) and the inner cylinder side assembly (the inner cylinder 12, the intermediate sleeve 18 and the main rubber elastic body 16), for example, when the outer cylinder side assembly is allowed to sheathe the inner cylinder side assembly, the rotation-stop rubbers 44 provided on the outer cylinder side assembly abut on the upper end face of the intermediate sleeve 18 in the inner cylinder side assembly to achieve positioning in the axial direction of the intermediate sleeve 18, and the pair of inclined projection parts 36 abut on (slidingly contact with) the inner periphery of the seal rubber layer 22 to achieve positioning in the circumferential direction of the intermediate sleeve 18. As a result, the present embodiment makes it possible to easily perform the positioning in the axial direction and the circumferential direction of the outer cylinder side assembly and the inner cylinder side assembly.

Figure 9:
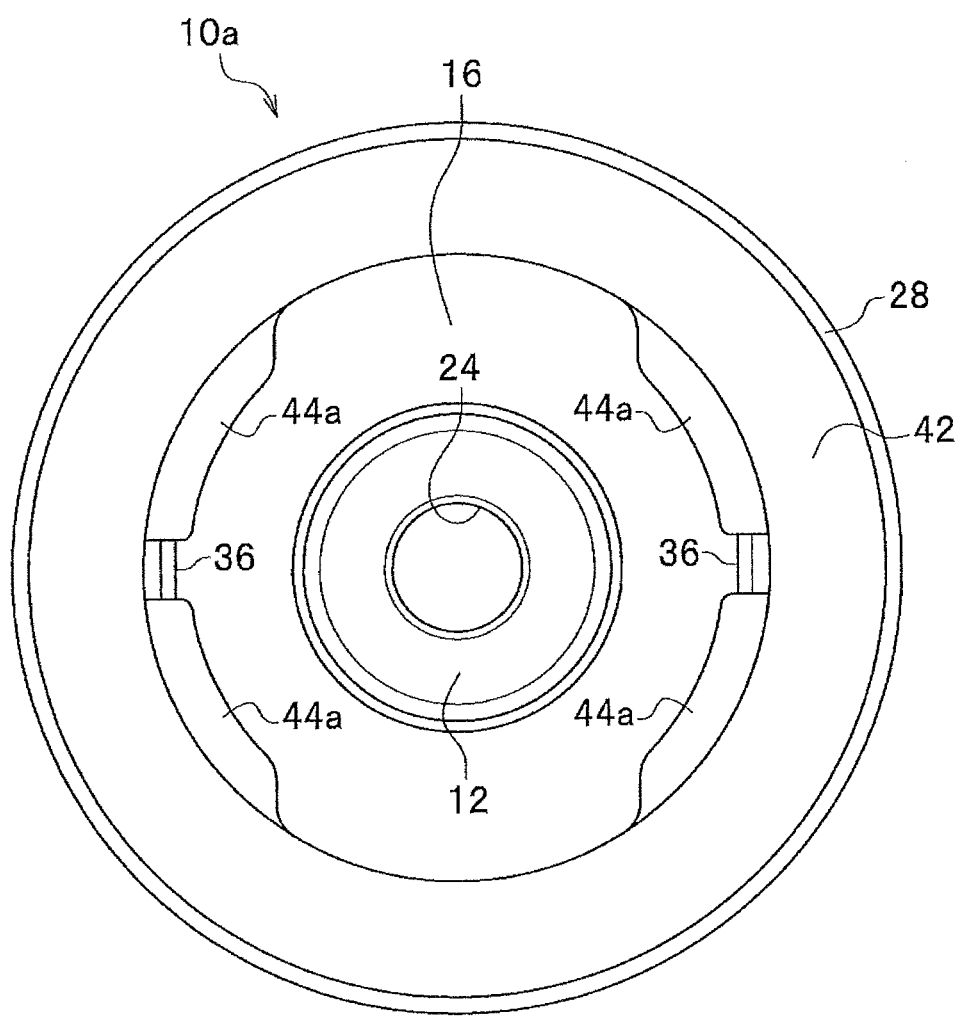
FIG. 9 is a plan view of a liquid-sealed vibration prevention device according to another embodiment of the present invention.

Next, other embodiments of the present invention will be described below. FIG. 9 is a plan view of a liquid-sealed vibration prevention device according to another embodiment of the present invention, and FIG. 10 is a plan view of a liquid-sealed vibration prevention device according to yet another embodiment of the present invention.

In the above embodiment shown in FIG. 2, each rotation-stop rubber 44 is formed in a nearly triangular shape in planar view, while in a liquid-sealed vibration prevention device 10a according to another embodiment shown in FIG. 9, each rotation-stop rubber 44a is formed in an arc-like shape in planar view, and the present embodiment is different in this respect from the above embodiment. Each rotation-stop rubber 44a is formed in an arc-like shape to increase an elastic force thereof, thereby making it possible to reliably achieve the rotation-stop action.

Figure 10:
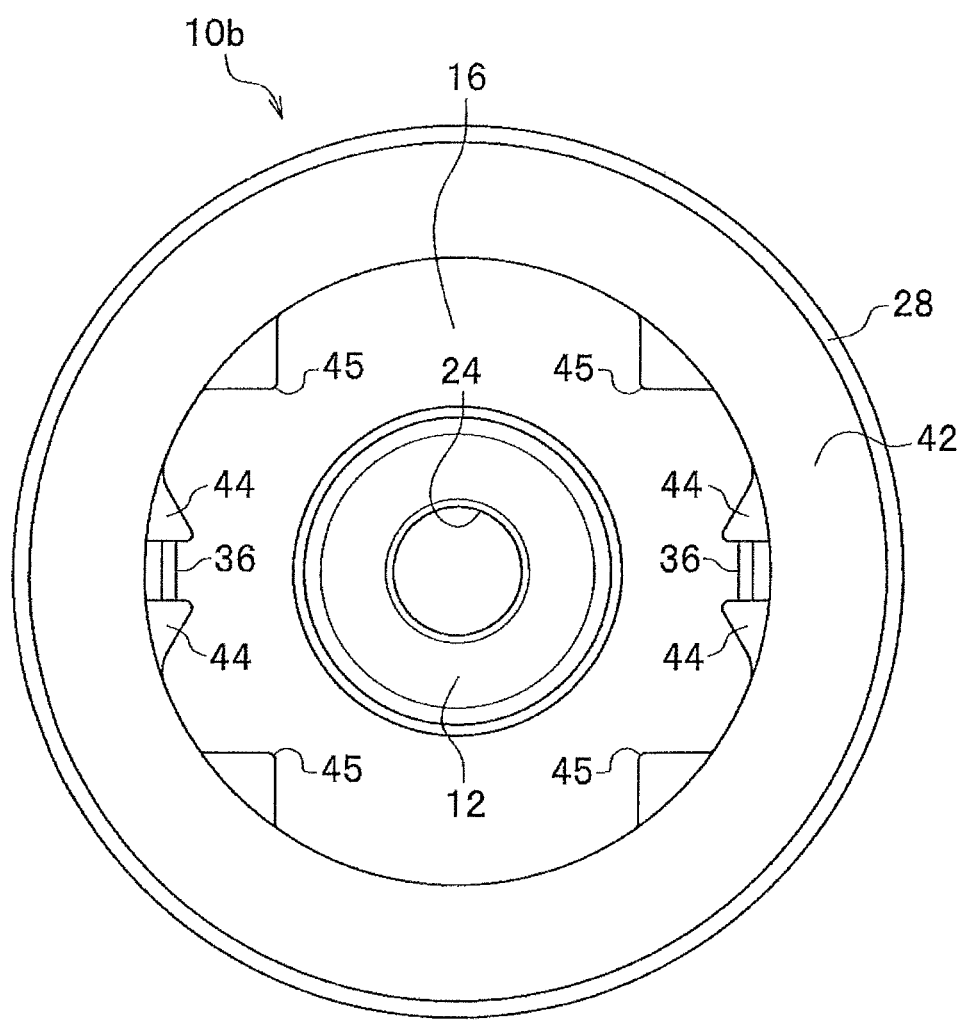
FIG. 10 is a plan view of a liquid-sealed vibration prevention device according to yet another embodiment of the present invention.

Moreover, in a liquid-sealed vibration prevention device 10b according to yet another embodiment as shown in FIG. 10, a positioning rubber 45 having the form of nearly a triangle in planar view is provided at four locations at an angle of about 90 degrees along the circumferential direction, besides the rotation-stop rubbers 44, and the present embodiment is different in this respect from the above embodiments. When the outer cylinder side assembly is allowed to sheathe the inner cylinder side assembly, the positioning rubbers 45 provided on the outer cylinder side assembly abut on the upper end face of the intermediate sleeve 18 in the inner cylinder side assembly, thereby making it possible to achieve positioning in the axial direction of the intermediate sleeve 18 in cooperation with the rotation-stop rubbers 44.

Note that the positioning rubber 45 has the form of a mountain having its vertex on the inner side in planar view, and is formed in a nearly rectangular shape in side view, in the same fashion as the rotation-stop rubber 44. Moreover, an upper surface of each positioning rubber 45 is set to be higher than the upper surface of the outer flange 28 in the up-down direction, and a lower surface thereof abuts on the upper end face of the intermediate sleeve 18 (the upper end face of the upper ring part 32a) on which the inclined projection part 36 is not provided.

Figure 11:
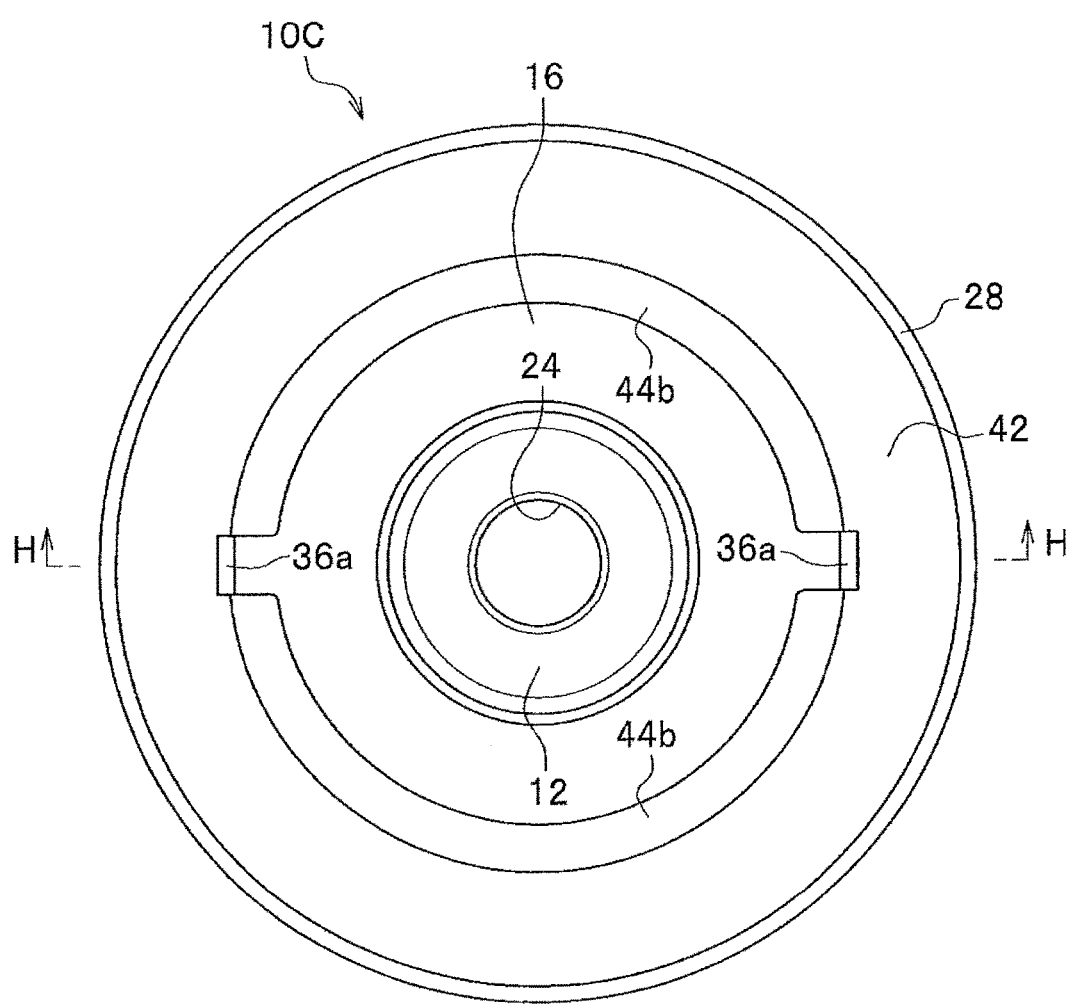
FIG. 11 is a plan view of a liquid-sealed vibration prevention device according to still another embodiment of the present invention.
Figure 12:
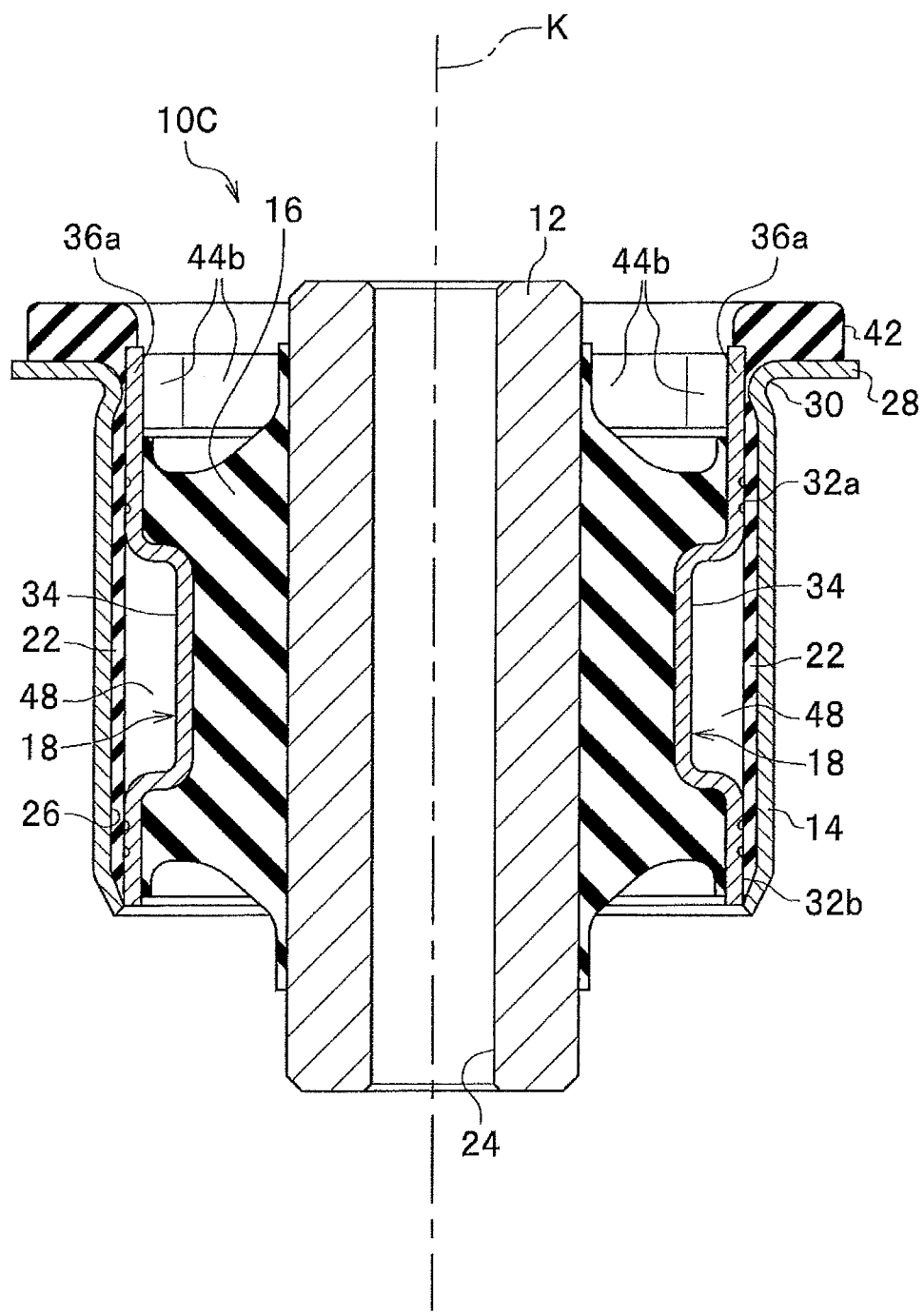
FIG. 12 is a sectional view in the axial direction, taken along the H-H line in FIG. 11.

FIG. 11 is a plan view of a liquid-sealed vibration prevention device according to still another embodiment of the present invention, and FIG. 12 is a sectional view in the axial direction, taken along the H-H line in FIG. 11.

In a liquid-sealed vibration prevention device 10c according to still another embodiment as shown in FIG. 12, a projection part 36a is provided without inclining a tip (upper end) thereof toward the side of the inner cylinder 12, to extend nearly parallel to the axis line K of the inner cylinder 12 and linearly in the vertical upper direction (upward), and the present embodiment is different in this respect from the inclined projection part 36 in the liquid-sealed vibration prevention devices 10, 10a, 10b according to the above embodiments. The projection part 36a is provided to allow the upper end thereof to be located on the upper side than the annular recess 30 of the outer cylinder 14, and to press an inner wall of the retaining rubber 42 outwardly in the radial direction to allow a portion thereof to be dug into the inner wall of the retaining rubber 42.

Moreover, in the liquid-sealed vibration prevention device 10c according to still another embodiment as shown in FIG. 11, a pair of rotation-stop rubbers 44b, 44b functioning as the rotation-stop parts are disposed opposite to each other in a nearly semicircular shape with the projection parts 36a sandwiched therebetween, and the present embodiment is different in this respect from the liquid-sealed vibration prevention devices 10, 10a, 10b according to the above embodiments. Note that the other configuration, operations and effects are the same as those in the above embodiments and thus detailed description thereof will be omitted.

REFERENCE SIGNS LIST 10, 10a, 10b, 10c Liquid-sealed vibration prevention device
12 Inner cylinder
14 Outer cylinder 16 Main rubber elastic body
18 Intermediate sleeve
22 Seal rubber layer
32a Upper ring part
36 Inclined projection part (Projection part)
36a Projection part
44, 44a, 44b Rotation-stop rubber (Rotation-stop part)

The invention claimed is:

1. A liquid-sealed vibration prevention device comprising:
an inner cylinder;
an intermediate sleeve disposed outside the inner cylinder;
a main rubber elastic body which is interposed between the inner cylinder and the intermediate sleeve to elastically connect the inner cylinder with the intermediate sleeve;
an outer cylinder which sheathes the intermediate sleeve; and
a seal rubber layer disposed on an inner circumferential surface of the outer cylinder, wherein
the intermediate sleeve is provided with a projection part which extends upward toward the inner cylinder,
the outer cylinder has an annular recess formed on a base portion of a flange that is formed on an opening periphery on an upper side of the outer cylinder,
the seal rubber layer has a retaining rubber located on an upper side of the seal rubber layer and on an inner side of the annular recess of the outer cylinder,
the retaining rubber has a stopper provided on an upper side thereof, the stopper being formed along the entire periphery on an upper surface of the flange and composed of a same material as the seal rubber layer, and
a rotation-stop part is provided on an upper part side of the seal rubber layer, the rotation-stop part being in contact with the stopper, projecting toward the inner cylinder side, holding the projection part in a circumferential direction, and composed of the same material as the seal rubber layer.

2. The liquid-sealed vibration prevention device according to claim 1, wherein
the projection part is provided at least one or more locations.

3. The liquid-sealed vibration prevention device according to claim 2, wherein
the projection part is an inclined projection part which extends diagonally upward toward the inner cylinder.

4. The liquid-sealed vibration prevention device according to claim 1, wherein
an upper end portion of the intermediate sleeve on which no projection part is provided abuts on a lower surface of the rotation-stop part.

5. The liquid-sealed vibration prevention device according to claim 1, wherein
the projection part is an inclined projection part which extends diagonally upward toward the inner cylinder.

* * * * *